Aug. 18, 1925.

J. KEYSER, JR 1,549,775

EMERGENCY TRACTION DEVICE FOR AUTO VEHICLES

Filed Oct. 16, 1924

Inventor
Joseph Keyser Jr
By W.W.Williamson

Patented Aug. 18, 1925.

1,549,775

UNITED STATES PATENT OFFICE.

JOSEPH KEYSER, JR., OF PHILADELPHIA, PENNSYLVANIA, ASSIGNOR TO BENJAMIN J. LIVINGSTON, OF PHILADELPHIA, PENNSYLVANIA.

EMERGENCY TRACTION DEVICE FOR AUTOVEHICLES.

Application filed October 16, 1924. Serial No. 743,862.

*To all whom it may concern:*

Be it known that I, JOSEPH KEYSER, Jr., a citizen of the United States, residing at Philadelphia, in the county of Philadelphia and State of Pennsylvania, have invented new and useful Improvements in Emergency Traction Devices for Autovehicles, of which the following is a specification.

My invention relates to a new and useful improvement in emergency traction devices for auto vehicles, and has for its object to provide a simple and effective device of this description which may be readily placed in contact with the tread of one or both of the drive wheels of an auto vehicle when the latter has become stalled by the wheels being embedded in soft ground, snow or ice in such manner that when the power is applied to said wheels they will draw under the emergency strips and by taking a firm grip upon the upper surface thereof will travel along said strips until reaching the firm portion of the road bed.

A further object of the invention is to so construct such an emergency strip that it will be not only flexible at right angles to its flat surfaces but will be more or less flexible edgewise.

A still further object of this invention is to so construct the strip that one section thereof may fold upon the other section for convenience in storing.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 4:
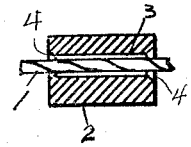
Fig. 4, is an enlarged cross section of one of the lags showing a portion of a cable passing through the same.

In carrying out my invention as here embodied, I utilize two or more cables 1 upon which the cross lags 2 are threaded by said cables passing through suitable holes 3 formed in said lags, said holes preferably being of slightly greater diameter than the cables and having their ends countersunk as indicated at 4 in Fig. 4.

Each of the end lags is rigidly secured upon the cables in any suitable manner such as by tying a knot 5 on the ends of the cables or by riveting. Between each of the lags is placed a spacing ball or sphere 6 so as to give to the emergency strip a limited flexibility in all directions.

Figure 1:
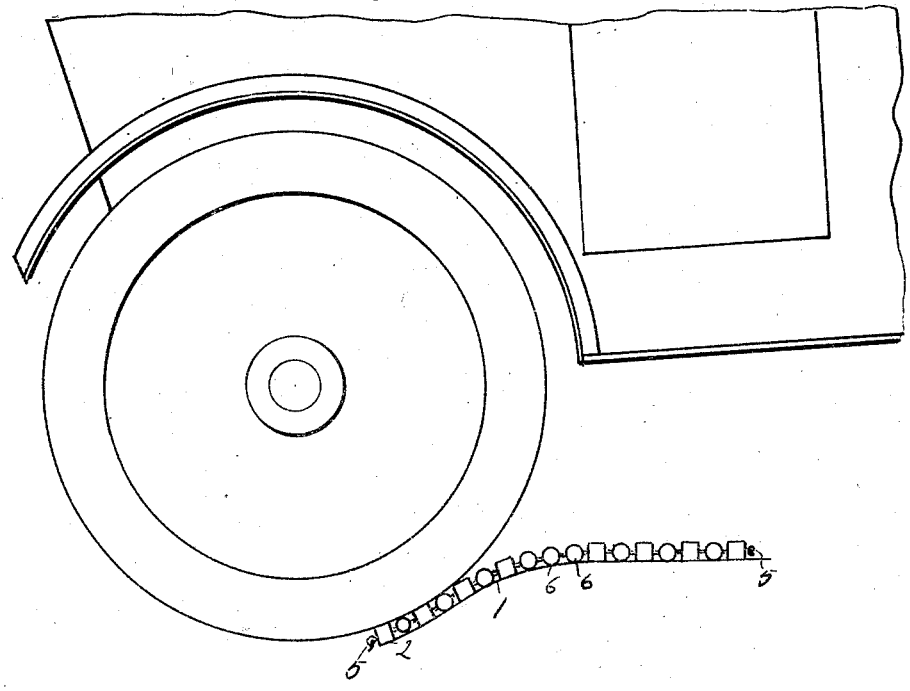
Fig. 1, is a side elevation of the rear portion of an automobile showing one of the driving wheels thereof in the position to ride upon the flexible strip.
Figure 2:
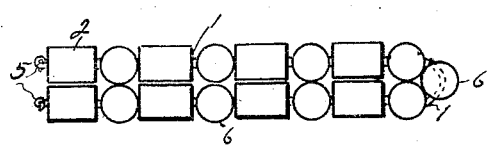
Fig. 2, is an edge view of the emergency strip in its folded position.
Figure 3:
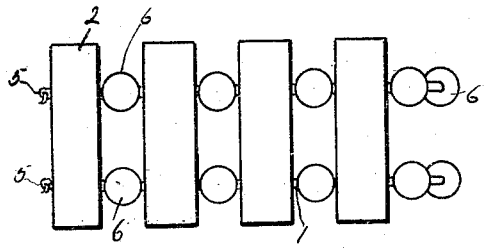
Fig. 3, is a plan view of Fig. 2.

The emergency strip is preferably divided into two sections by the placing of three of the balls 6 on each cable at the center portion thereof all of said balls being threaded upon the cables as clearly shown and this will permit the two sections to be folded upon each other, as clearly shown in Figs. 2 and 3.

Where it is found desirable two balls may be interposed between the sections of the emergency strip instead of three balls or this number may be increased and while I prefer to use cables for the threading strands it is obvious flexible wires or ropes may be used for this purpose.

In practice when the power wheel which is usually the rear wheel of an automobile becomes embedded in a soft portion of the road it is only necessary to place one end of the emergency strip in contact with the front portion of the tread of the wheel when by applying power to the wheel it will tend to draw the strip beneath the tread until sufficient traction is created between the tread and the upper surface of the strip when the wheel will ride up and forward over the strip until it contacts with the solid portion of the road bed thus requiring no effort or labor upon the part of the driver and as the strip is flexible to a sufficient degree in all directions it will readily adapt itself to the cavity in the road bed and to the tread of the wheel and being composed of cross lags will give the tread of the wheel a positive grip thereon so as to prevent slipping.

When the strip is not in use it is readily folded to the position shown in Figs. 2 and 3 for storage in the tool box or the vehicle where it will be of ready access for future use.

On account of the holes 3 being in slightly greater diameter than the cables which pass therethrough the lags will have a limited freedom of movement which facilitates their adaptation to the road bed and the tread of the wheel and by countersinking the ends of these holes the cables will be less distorted when the strip is flexed in either direction or when the sections of this strip are folded for storage.

Of course I do not wish to be limited to the exact details of construction as herein shown as these may be varied within the limits of the appended claims without departing from the spirit of my invention.

Having thus fully described my invention, what I claim as new and useful is:—

1. In a device of the character described, a series of lags having holes therethrough, cables of less diameter than said holes passing through the latter, the end lags being secured to the cable, and a series of balls threaded upon said cables and interposed between the lags.

2. In a device of the character described, a series of cross lags, holes formed through the lags, the ends of said holes being flared, cables threaded through said holes, said cables being of less diameter than the diameter of said holes, and a series of balls threaded upon the cables and interposed between the lags.

3. An emergency traction strip for motor vehicles consisting of two sections, each section consisting of a series of lags having cables passing through holes in said lags, a ball interposed between the adjacent end lags of said sections, and a plurality of balls threaded upon each cable and interposed between said sections.

In testimony whereof, I have hereunto affixed my signature.

JOSEPH KEYSER, Jr.